United States Patent
Sato

(10) Patent No.: US 6,392,499 B1
(45) Date of Patent: May 21, 2002

(54) FREQUENCY SHIFT MODULATION CIRCUIT

(75) Inventor: Tetsuo Sato, Yokohama (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/556,014

(22) Filed: Apr. 20, 2000

(30) Foreign Application Priority Data

Apr. 26, 1999 (JP) ............................................. 11-117776

(51) Int. Cl.[7] .............................................. H04L 27/12

(52) U.S. Cl. ...................... 332/100; 332/101; 332/127; 375/272; 375/275; 375/303; 375/306

(58) Field of Search ................................. 332/100, 101, 332/127; 375/303, 306, 272, 275

(56) References Cited

U.S. PATENT DOCUMENTS 5,436,599 A * 7/1995 Franson et al. ............. 332/101

* cited by examiner

Primary Examiner—Arnold Kinkead
(74) Attorney, Agent, or Firm—Eric J. Robinson; Nixon Peabody LLP

(57) ABSTRACT

A frequency shift modulation circuit has a direct digital synthesizer DDS and a phase-locked loop PLL. DDS stores output signal frequency data in a plurality of registers. DDS selects the register storing the frequency data in accordance with a frequency shift keying FSK data signal whose voltage was controlled by a comparator. A signal output from DDS is input to PLL. PLL generates a signal whose phase is synchronized with the signal supplied from DDS, and outputs a frequency shift signal having a shift amount corresponding to the digital value of the FSK data signal. The FSK data signal is input via a balance adjustor to PLL so that a large frequency shift is possible. Since the frequency data is set to DDS, a stable modulation even for a low frequency is possible. In this manner, the frequency of an output signal can be stably shifted.

5 Claims, 3 Drawing Sheets

FREQUENCY SHIFT MODULATION CIRCUIT

BACKGROUND OF THE INVENTION

1. Field of the Invention

The present invention relates to a frequency shift modulation circuit, and more particularly to a frequency shift modulation circuit capable of reliably shifting the frequency of an output signal.

2. Description of the Related Art

A conventional frequency shift modulation circuit such as shown in FIG. 6 is known.

This modulation circuit has a reference oscillator 51 for generating a signal having a reference oscillation frequency, and operates in the following manner.

A frequency shift keying (FSK) data signal is supplied to a modulation level adjustor 50 which adjusts the modulation level of the FSK data signal and supplied to the reference oscillator 51 and via a balance adjustor 53 to a phase-locked loop (PLL) 52. The reference oscillator 51 generates a signal having an oscillation frequency corresponding to the input FSK data signal. The PLL 52 outputs a frequency shift signal whose phase is synchronized with that of the reference frequency signal output from the reference oscillator 51 and whose frequency is defined by the FSK data signal.

A conventional frequency shift modulation circuit such as shown in FIG. 7 is also known.

This modulation circuit is input with an external signal having a reference frequency, and two PLLs 60 and 61 converts the frequency of an output signal in accordance with an FSK data signal, to thereby shift the frequency of an output signal of the modulation circuit.

PLL 60 shifts the frequency of a low frequency band signal, whereas PLL 61 shifts the frequency of a high frequency band signal.

According to the above-described conventional techniques, the modulation circuit having the reference oscillator shown in FIG. 6 has a limit of the range wherein the reference oscillator can stably shift the frequency.

Therefore, if the frequency shift width is broadened, the frequency stability lowers and the frequency of an output signal cannot be shifted stably.

With the modulating circuit for shifting the frequency by using two PLLs shown in FIG. 7, an output signal having a low frequency (e.g, 10 Hz or lower) cannot be generated because of the response characteristics of PLL.

SUMMARY OF THE INVENTION

The invention has been made under the above-described circumstances and aims at providing a frequency shift modulation circuit capable of stably shifting the frequency of an output signal.

In order to achieve the above object of the invention, according to one aspect of the invention, there is provided a frequency shift modulation circuit for generating a frequency shift signal whose frequency is shifted in accordance with a value of digital data, the frequency modulation circuit comprising: a composite oscillator such as a direct digital synthesizer for receiving predetermined frequency setting data and outputting a reference frequency signal having a frequency represented by the frequency setting data; and a phase sync circuit for generating a frequency shift signal whose phase is synchronized with the reference frequency signal output from the composite oscillator.

In the structure of the frequency shift modulation circuit, the composite oscillator has a plurality of frequency registers for storing the frequency setting data representing different frequencies. The composite oscillator has also the signal generator for selecting one of the plurality of frequency registers, reading the frequency setting data from the selected frequency register, and generating a reference frequency signal for the phase sync circuit having a frequency represented by the read frequency setting data. The phase sync circuit generates a frequency shift signal whose phase is synchronized with the reference frequency signal output from the composite oscillator.

Accordingly, the frequency of the reference frequency signal can be switched discretely, so that a frequency shift signal having a high frequency stability and a large frequency shift can be obtained.

The signal generator preferably includes selecting means for selecting the frequency register from which the frequency setting data is read, in accordance with a value of the digital data. Accordingly, the frequency of an output signal can be discretely switched in accordance with the value of modulation digital data, so that a frequency shift signal having a high frequency stability and a large frequency shift can be obtained.

The frequency shift modulation circuit may further comprises a supply circuit for shaping a portion of a waveform of the digital data and supplying the shaped waveform to the phase sync circuit, wherein the phase sync circuit includes means such as a voltage-controlled oscillator (VCO) for shifting a frequency of the frequency shift signal in accordance with a value of digital data supplied from the supply circuit. In this case, the waveform shaped digital data can be made matching the frequency shift level of an output signal from the composite oscillator, so that a large frequency shift can be made stably.

According to a second aspect of the invention, there is provided a frequency shift modulation circuit having at least two sets of frequency setting data, wherein the frequency shift modulation circuit modulates and shifts a frequency of an output signal having a frequency represented by the frequency setting data corresponding to a value of modulation digital data.

The frequency shift modulation circuit is preferable provided with a CPU for fetching an external input signal such as an FSK data signal and generating the digital data. In this case, it is possible to prevent the frequency shift fluctuation to be caused by a level change in the input signal, and more stable frequency modulation becomes possible. The baud rate of transmission data may be changed by software, or the input data may be added with a bit sync, a frame sync, an error correction code and the like.

DETAILED DESCRIPTION OF THE PREFERRED EMBODIMENT

A preferred embodiment of the invention will be detailed in detail with reference to the accompanying drawings.

Figure 1:
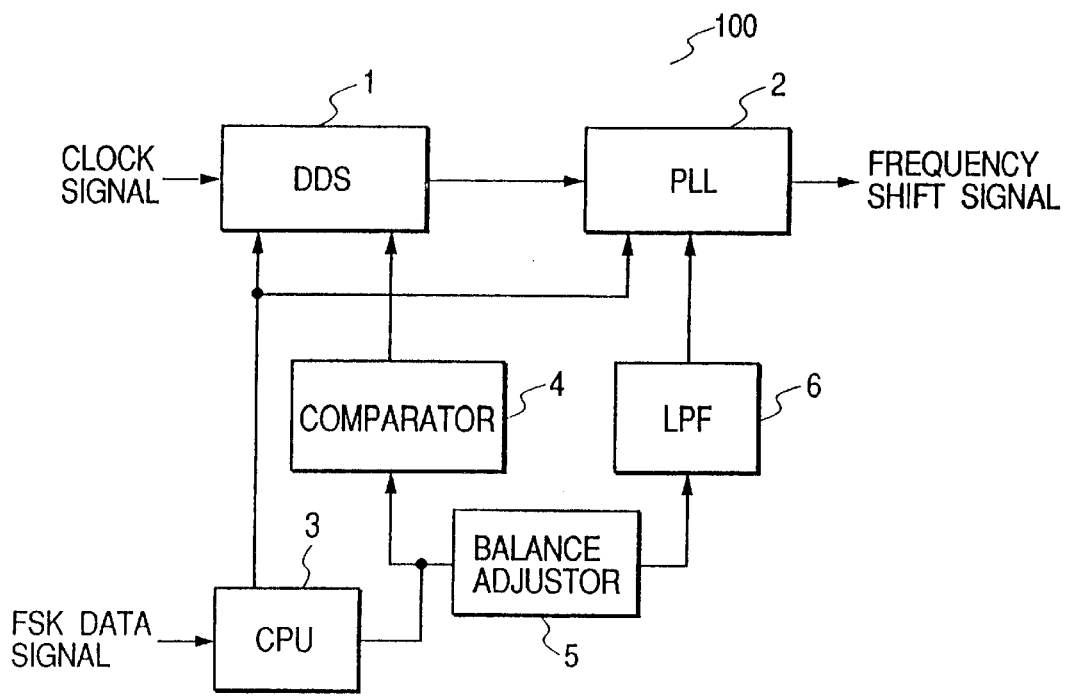
FIG. 1 is a block diagram showing the structure of a frequency shift modulation circuit according to an embodiment of the invention.

FIG. 1 is a block diagram showing the structure of a frequency shift modulation circuit 100 according to an embodiment of the invention.

As shown in FIG. 1, the frequency shift modulation circuit 100 has a direct digital synthesizer (DDS) 1, a phase-locked loop (PLL) 2, a central processing unit (CPU) 3, a compartor 4, a balance adjustor 5, and a low pass filter 6.

DDS 1 is a composite oscillator for generating a plurality of reference frequency signals having different frequencies and supplies one of them to PLL 2 in order to realize frequency shift keying (FSK) modulation.

Figure 2:
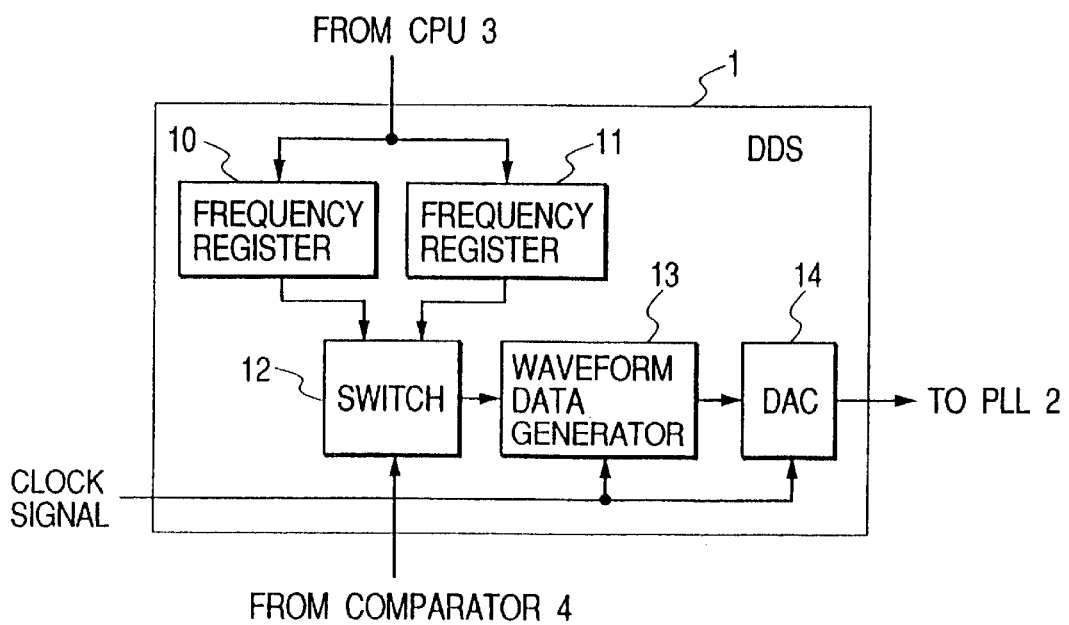
FIG. 2 is a block diagram showing the structure of a direct digital synthesizer (DDS).

In order to realize such a function of DDS 1, it has, for example as shown in FIG. 2, a first frequency register 10, a second frequency register 11, a switch 12, a waveform data generator 13, and a digital-to-analog converter (DAC) 14.

The first and second frequency registers 10 and 11 are each constituted of flip-flops and the like and store frequency setting data for setting the frequency of the reference frequency signal to be output from DDS 1.

The frequency setting data is set by CPU 3 to the first and second frequency registers 10 and 11, and indicates a phase increment amount $\Delta\theta$ of the reference frequency signal represented a time interval defined by a clock signal.

The switch 12 is made of a semiconductor switch or the like, and switches the frequency of the reference frequency signal to be output from DDS 1, in accordance with the FSK modulation data signal.

More specifically, in accordance with the FSK data signal received from CPU 3 via the comparator 4, the switch 12 selects either the output of the first frequency register 10 or the output of the second frequency register 11 and inputs the selected output to the waveform data generator 13.

Namely, if the FSK data signal has a digital level "1", the switch 12 selects the output of the first frequency register 10 and inputs it to the waveform data generator 13, whereas if the FSK data signal has a digital level "0", the switch 12 selects the output of the second frequency register 11 and inputs it to the waveform data generator 13.

The waveform data generator 13 is constituted of a full adder, a latch, a read-only memory (ROM) and the like and generates a digital value representative of the amplitude of a sine wave.

More specifically, the waveform data generator 13 reads the frequency setting data from the first frequency register 10 or second frequency register 11 via the switch 12 each time a clock signal rises (or falls) The waveform data generator 13 cumulatively adds the phase increment amount $\Gamma\theta$ indicated by the frequency setting data by neglecting a carry to thereby define the phase of the reference frequency signal, to generate a digital signal representative of the amplitude of the sine wave corresponding to each phase, and to send the digital signal to DAC 14.

DAC 14 is a digital-to-analog converter for converting the digital signal representative of the amplitude of the sine wave generated by the waveform data generator 13 into an analog sine wave which is supplied to PLL 2 as the reference frequency signal.

PLL 2 shown in FIG. 1 generates a frequency shift signal in accordance with the reference frequency signal supplied from DDS 1.

Figure 3:
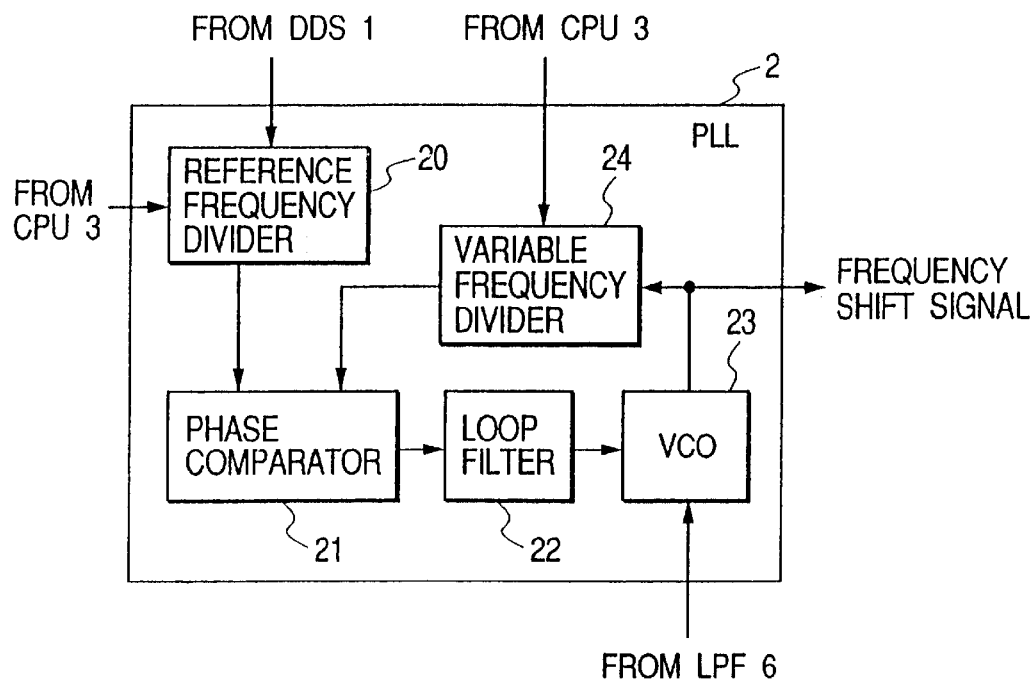
FIG. 3 is a block diagram showing the structure of a phase-locked loop (PLL).

As shown in FIG. 3, PLL 2 has a reference frequency divider 20, a phase compartor 21, a loop filter 22, a voltage-controlled oscillator (VC)) 23, and a variable frequency divider 24.

The reference frequency divider 20 frequency-divides the frequency of the reference frequency signal received from DDS 1 (or more precisely from DAC 14) to obtain the reference frequency signal for PLL 2. More specifically, the reference frequency divider 20 receives the reference frequency data from CPU 3 and frequency-divides the reference frequency signal received from DDS 1 by a frequency division ratio defined by the reference frequency data to thereby obtain the reference frequency signal for PLL 2.

The reference frequency signal for PLL 2 generated by the reference frequency divider 20 is used as one input to the phase comparator 21 and as a reference signal based on which PLL 2 synchronizes the phase of the frequency shift signal.

The phase comparator 21 outputs a voltage corresponding to a phase difference between the reference frequency signal for PLL 2 supplied from the reference frequency divider 20 and a signal received from the variable frequency divider 24.

The loop filter 22 is a low-pass filter for removing high frequency components of the voltage output from the phase comparator 21.

VCO 23 generates a signal having a frequency corresponding to voltages received from the loop filter 22 and LPF 6 and outputs the frequency shift signal.

The variable frequency divider is constituted of a prescaler, a program counter and the like, converts the frequency of the frequency shift signal output from VCO 23 into a frequency capable of being compared with the reference frequency signal, and feeds back the converted signal to the phase comparator 21.

More specifically, the variable frequency divider 24 receives output frequency data from CPU 3 and determines the frequency division ratio corresponding to the output frequency data. The variable frequency divider 24 frequency-divides the frequency shift signal output from VCO 23 by the determined frequency division ratio.

The frequency shift signal divided by the variable frequency divider 24 is input to the phase compartor 21 as the other input thereof to thus realize the feedback operation of PLL 2.

CPU 3 shown in FIG. 1 controls the whole operation of the frequency shift modulation circuit 100.

The comparator 4 functions as a voltage adjustor for converting the FSK data signal received from CPU 3 into a drive voltage level of the switch 12.

The balance adjuster 5 is made of a variable resistor or the like and adjust the frequency shift amount by defining an input balance of the FSK data signal of a transistor-transistor logic (TTL) level output from CPU 3, to DDS 1 and PLL 2.

LPF 6 is a Bessel type low pass filter for removing the high frequency components from the FSK data signal to be input to PLL 2.

Next, the operation of the frequency shift modulation circuit according to the embodiment of the invention will be described.

The frequency shift modulation circuit 100 has DDS 1 which can generate a plurality of reference frequency signals having different frequencies to generate the reference frequency signal for PLL 2 so that a large frequency shift can be obtained without level adjustment.

For the frequency shift modulation by the frequency shift modulation circuit, first CPU 3 sets initial data for the frequency shift modulation.

Namely, CPU 3 writes frequency setting data for determining the frequency of the reference frequency signal into the frequency registers 10 and 11 of DDS 1. CPU 3 also sets the reference frequency data for generating the reference frequency signal for PLL 2 to the reference frequency divider 20 of PLL 2.

The frequency setting data written in the first and second frequency registers 10 and 11 indicate the phase increment amount $\Delta\theta$ of the reference frequency signal during one clock period. The phase increment amount $\Delta\theta_1$ written in the first frequency register 10 is different from the phase increment amount $\Delta\theta_2$ written in the second frequency register 11 so that the reference frequency signals having different frequencies can be generated.

For example, the first frequency register 10 stores the frequency setting data for shifting the frequency of the reference frequency signal by an amount corresponding to the digital level "1" of the FSK data signal, whereas the second frequency register 11 stores the frequency setting data for shifting the frequency of the reference frequency signal by an amount corresponding to the digital level "0" of the FSK data signal.

Next, the frequency shift modulation circuit 100 starts the frequency shift modulation in response to the externally supplied FSK data and the clock signal.

After the frequency shift modulation starts, CPU 3 fetches the external FSK data signal and outputs it at a TTL level and supplies it to the comparator 4 and balance adjustor 5.

In this case, CPU 3 can change the baud rate of transmission data by software. For example, CPU 3 may change the bit rate 1200 bps (bit per second) of the external FSK data signal to 9600 bps and output it or conversely CPU 3 may change the bit rate 960 of the external FSK signal to 1200 bps and output it.

CPU 3 also adds a bit sync, a frame sync, an error correction code and the like to the external FSK data signal and output it.

Since CPU 3 fetches the external FSK data signal, it is possible to prevent the frequency shift fluctuation to be caused by the level change in the FSK data signal and stably shift the frequency.

The comparator 4 adjusts the voltage of the FSK data signal supplied from CPU 3 and supplies it to the switch 12 of DDS 1.

The switch 12 of DDS 1 receives the FSK data signal from the comparator 4 and selects either the first frequency register 10 or second frequency register 11.

Namely, if the FSK data signal has a digital level "1", the switch 12 selects the output of the first frequency register 10 and inputs it to the waveform data generator 13, whereas if the FSK data signal has a digital level "0", the switch 12 selects the output of the second frequency register 11 and inputs it to the waveform data generator 13.

DDS 1 can therefore discretely change the frequency of the reference frequency signal in accordance with the FSK data signal.

The waveform generator 13 reads the frequency setting data from either the first frequency register 10 or second frequency register 11 via the switch 12, generates the digital signal representative of the amplitude of the reference frequency signal and supplies the generated digital signal to DAC 14.

In accordance with the digital signal supplied from the waveform data generator 13, DAC 14 generates the analog reference frequency signal and sends it to PLL 2.

Upon reception of the reference frequency signal from DDS 1 (more precisely from DAC 14), the reference frequency divider 20 of PLL 2 frequency-divides the reference frequency signal by the frequency division ratio defined by the reference frequency data set by CPU 3. The reference frequency divider 20 supplies the frequency-divided reference frequency signal to the phase comparator 21 as the reference frequency signal for PLL 2.

The phase comparator 21 compares the phase of the reference frequency signal for PLL 2 received from the reference frequency divider 20 with the phase of the frequency shift signal frequency-divided by the variable frequency divider 24, and supplies a voltage proportional to the phase difference to VCO 23 via the loop filter 22.

VCO 23 outputs a frequency shift signal having a frequency corresponding to the voltages supplied from the phase comparator 21 via the loop filter 22 and supplied from CPU 3 via the balance adjustor 5 and LPF 6.

A portion of the frequency shift signal output from VCO 23 is frequency-divided by the variable frequency divider 24 and fed back to the phase comparator 21. The frequency division ratio at which the variable frequency divider 24 divides the frequency shift signal is defined by the output frequency data set by CPU 3.

PLL 2 can therefore stably realize a large frequency shift while the continuity of the phase of the frequency shift signal is retained and while the frequency shift level of the reference signal output from DDS 1 is taken into consideration.

As described above, in the frequency shift modulation circuit 100, the switch 12 selects the output of either the first frequency register 10 or second frequency register 11 and supplies the selected output to the waveform data generator 12. DDS 1 can therefore discretely shift the frequency of the reference frequency signal in accordance with the FSK data signal.

It is therefore possible to stably shift the frequency in a large range, and to modulate the low frequency FSK signal by setting the frequency setting data to the first frequency register 10 or second frequency register 11.

In the frequency shift modulation circuit 100, CPU 3 fetches the external FSK data signal and outputs it at a TTL level.

It is therefore possible to prevent the frequency shift fluctuation to be caused by the level change in the FSK data signal and stably shift the frequency. The baud rate of the transmission data may be changed by software, or the external FSK data signal may be added with a bit sync, a frame sync, an error correction code and the like.

The invention is not limited only to the above-described embodiment, but various modifications and applications are possible. For example, in the above embodiment, although DDS 1 has two frequency registers 10 and 11, more frequency registers may also be used.

Figure 4:
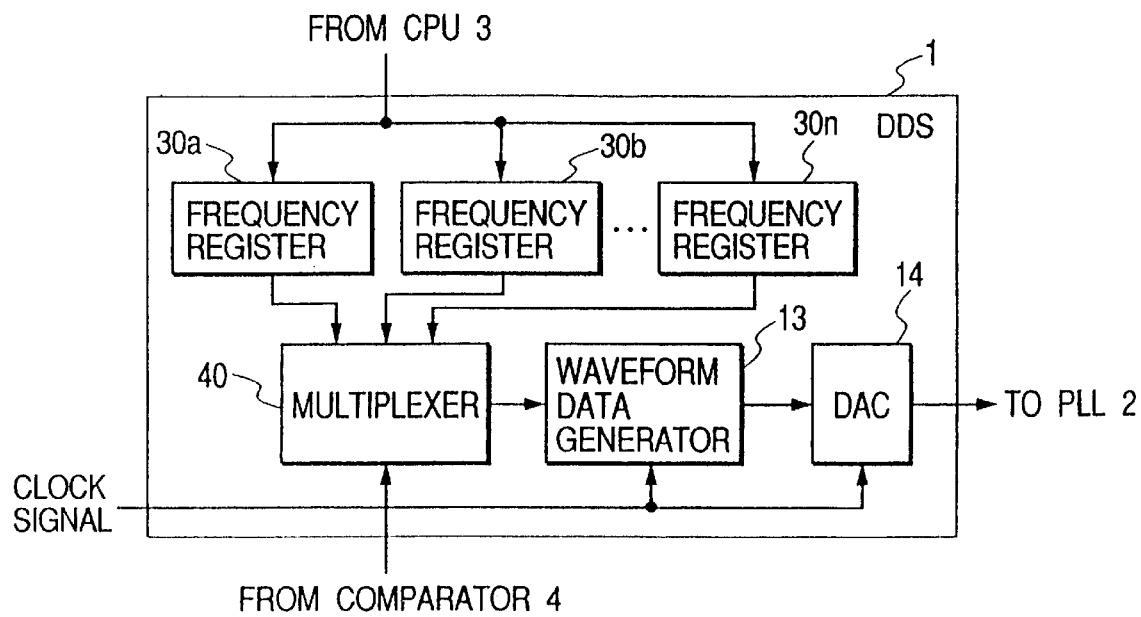
FIG. 4 is a block diagram showing the structure of DDS of a frequency shift modulation circuit according to a modification of the embodiment of the invention.

In this case, as shown in FIG. 4, in place of the switch 12 shown in FIG. 2, a multiplexer 40 is used for selecting one of a plurality of frequency registers 30a to 30n (where n is an optional number) in accordance with the FSK data signal and outputting the contents of the selected frequency register to the waveform data generator 13.

It is therefore possible to execute multi-value frequency shift modulation wherein a signal at a certain frequency represents data of a plurality of bits.

Figure 5:
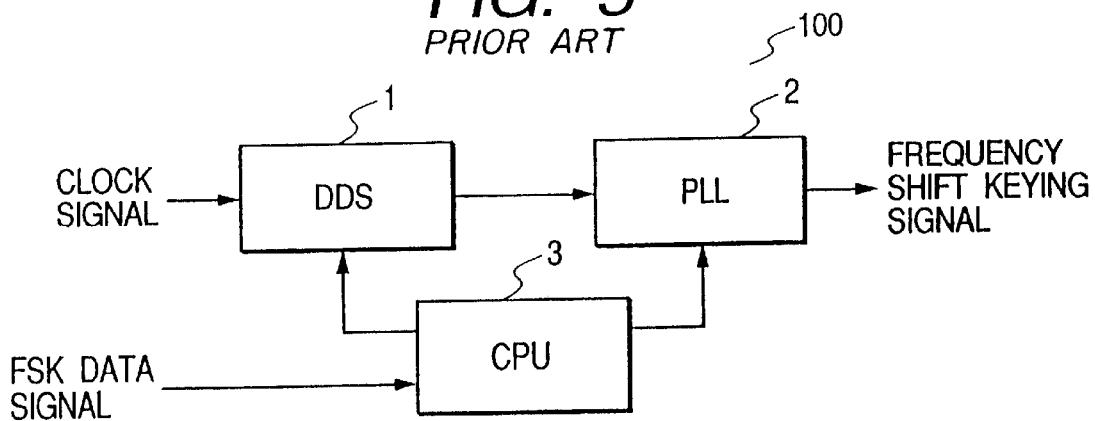
FIG. 5 is a block diagram showing the structure of a frequency shift modulation circuit according to a modification of the embodiment of the invention.
Figure 6:
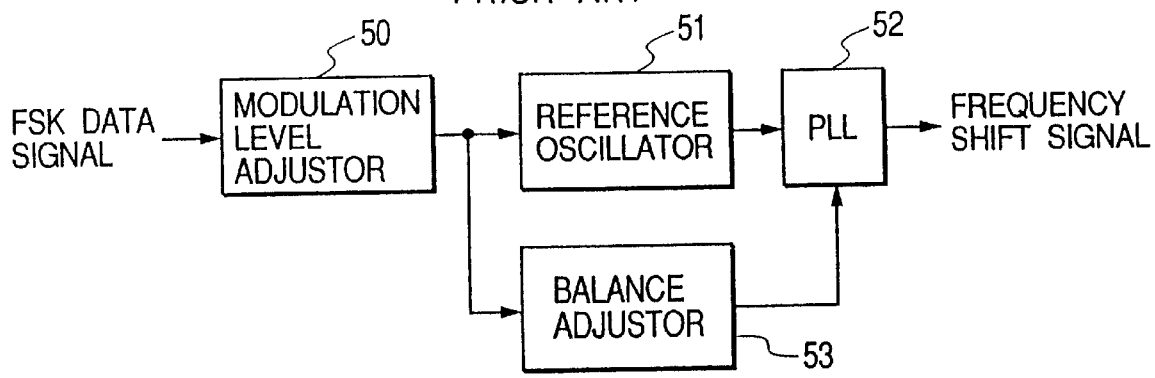
FIG. 6 is a block diagram of a conventional frequency shift modulation circuit.
Figure 7:
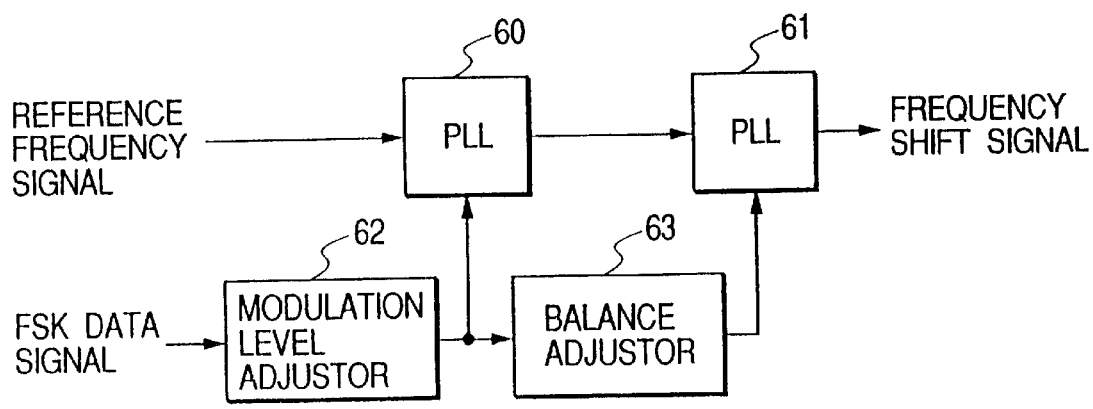
FIG. 7 is a block diagram of another conventional frequency shift modulation circuit.

As shown in FIG. 5, CPU 3 may have the functions of the comparator 4, balance adjustor 5 and LPF 6. In this case, a signal for shifting the frequency of an output signal may be directly sent to DDS 1 and PLL 2.

As described above, according to the invention, DDS for supplying a reference signal to PLL has a plurality of frequency registers so that the frequency of the reference frequency signal can be discretely changed in accordance with the FSK modulation data signal.

What is claimed is:

1. A frequency shift modulation circuit for generating a frequency shift signal whose frequency is shifted in accordance with a value of digital data, comprising:

a composite oscillator provided with a waveform date generator, for receiving at least two predetermined frequency setting data, selectively applying one of said at least two frequency setting data to the waveform data generator to generate a reference frequency signal having a frequency represented by the selected frequency setting data; and a phase sync circuit for generating a frequency shift signal whose phase is synchronized with the reference frequency signal output from said composite oscillator.

2. A frequency shift modulation circuit according to claim 1, wherein said composite oscillator further comprises:

a plurality of frequency registers for storing said at least two frequency setting data representing different frequencies; and said waveform generator selects one of the plurality of frequency registers, reads the frequency setting data from the selected frequency register, and generates a reference frequency signal for said phase sync circuit having a frequency represented by the read frequency setting data.

3. A frequency shift modulation circuit according to claim 1, wherein said waveform data generator includes selecting means for selecting the frequency register from which the frequency setting data is read, in accordance with a value of the digital data.

4. A frequency shift modulation circuit according to claim 1 or 2, further comprising a supply circuit for shaping a portion of a waveform of the digital data and supplying the shaped waveform to said phase sync circuit, wherein said phase sync circuit includes means for shifting a frequency of the frequency shift signal in accordance with a value of digital data supplied from said supply circuit.

5. A frequency shift modulation circuit according to claim 1 further, comprising a CPU for fetching an external input signal and generating the digital data.

\* \* \* \* \*